United States Patent
Wong et al.

(10) Patent No.: US 8,345,570 B2
(45) Date of Patent: Jan. 1, 2013

(54) NETWORK IMPAIRMENT METRICS FOR TIMING OVER PACKET

(75) Inventors: Kin Yee Wong, Ottawa (CA); Peter Roberts, Stittsville (CA)

(73) Assignee: Alcatel Lucent, Paris (FR)

( * ) Notice: Subject to any disclaimer, the term of this patent is extended or adjusted under 35 U.S.C. 154(b) by 308 days.

(21) Appl. No.: 12/635,373

(22) Filed: Dec. 10, 2009

(65) Prior Publication Data
US 2011/0142079 A1   Jun. 16, 2011

(51) Int. Cl.
*H04J 3/14* (2006.01)
(52) U.S. Cl. .......... 370/252; 370/503; 709/224
(58) Field of Classification Search .......... 370/252–253; 709/223–224
See application file for complete search history.

(56) References Cited

U.S. PATENT DOCUMENTS

| | | | |
|---|---|---|---|
| 5,570,346 A * | 10/1996 | Shur | 370/253 |
| 6,430,160 B1 * | 8/2002 | Smith et al. | 370/252 |
| 7,830,922 B2 * | 11/2010 | Andre | 370/252 |
| 7,835,280 B2 * | 11/2010 | Pang et al. | 370/503 |
| 2001/0039580 A1 * | 11/2001 | Walker et al. | 709/224 |
| 2002/0093917 A1 * | 7/2002 | Knobbe et al. | 370/252 |
| 2005/0270982 A1 * | 12/2005 | McBeath | 370/252 |
| 2011/0019558 A1 * | 1/2011 | Rowe et al. | 370/252 |

* cited by examiner

*Primary Examiner* — Jeffrey M Rutkowski
(74) *Attorney, Agent, or Firm* — Kramer & Amado P.C.

(57) ABSTRACT

The invention is directed to providing a system and method for monitoring a clock synchronization metric in a timing-over-packet system to provide a metric for service-level agreements (SLA), by providing a measure of the stability of the packet transfer delay relative to a representative statistic such as a median or minimum.

15 Claims, 3 Drawing Sheets

NETWORK IMPAIRMENT METRICS FOR TIMING OVER PACKET

FIELD OF THE INVENTION

The invention is directed to packet switching communication networks, and particularly to monitoring packet transfer delay for timing-over-packet systems.

BACKGROUND OF THE INVENTION

Packet transfer delay (PTD) and symmetrical PTD are important for many timing-over-packet techniques. However, currently there appears to be no way to express meaningful service level requirements on packet networks that provide services that rely on the performance of these techniques. Service Level Agreements (SLAs) need predefined and agreed-upon metrics so that customers of telecommunications services can understand the performance characteristics of the services they are buying and to ensure that theses services are compatible with equipment they will connect to the services. Telecommunications service providers also need to know what performance levels they are committing to and equally important, the ability to measure those performance levels in a meaningful way and on a regular basis so that their equipment can take corrective action if the measured performance parameters begin to deteriorate.

One known solution for deriving timing information is based on a concept known as "lucky packet" or fastest packet. The "lucky" packet is the fastest timing packet to transit from a source (e.g. master node) to the destination (e.g. slave node). In the case of adaptive clock techniques associated with circuit emulation services, the fastest packet can be determined using the buffer residence time of each timing packet in the receive buffer of the slave node. Since packets are sent from the master node at regular intervals and retrieved from the slave's receive buffer at regular intervals, the packet with the longest buffer residence time must have transited the network the fastest compared to all other packets in the receive buffer. In the case of timestamp exchange protocols, like Network Time Protocol (NTP) or IEEE1588, the difference between the origination and reception timestamps can be used determine the fastest packet. With reference to prior art FIG. 1, the fastest packet 102, 104, 106, 108 is determined at regular intervals 110, 112, 114, 116. Since each of the fastest packets incurred the least amount of network delay during its respective interval, the variability in determining timing information should be minimal if that information is derived from the fastest packets.

A possible disadvantage of the "lucky packet" technique is that it does not provide a meaningful measure of the overall performance of packet transfer delay. The only packets being measured are ones encountering little or no delay through the network. Another possible disadvantage of this technique is that it requires many consecutive window measurements to determine the stability of the lucky packets. This may require prolonged measurements for each location under test. Management resources may limit the number of tests that can be accomplished in a given period.

Another known technique is to calculate the median packet transfer delay 118, 120, 122, 124 of packets received during each regular interval 110, 112, 114, 116. The median packet transfer delay technique has the same disadvantages as for the 'lucky packet' technique.

Another known technique is to measure maximum packet delay variance over regular time intervals, which also may not be sufficient for many real-world situations.

Therefore an improved system or method for measuring network impairments for timing-over-packet networks is desired.

SUMMARY OF THE INVENTION

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

An aspect of the present invention is directed to providing a method for monitoring a clock synchronization metric in a timing-over-packet system. The method comprises steps of: measuring at a network node, a packet transfer delay for each of a plurality of incoming timing packets; logging each packet transfer delay; calculating a representative statistic of packet transfer delay for the incoming packets received during a predefined time interval, and calculating a percentage of packet transfer delay measurements received during the predefined time interval within a predefined range from the representative statistic of packet transfer delay.

In some embodiments of the invention, the representative statistic of packet transfer delay is a minimum packet transfer delay.

In some embodiments of the invention, the representative statistic of packet transfer delay is a median packet transfer delay.

In some embodiments of the invention, the step of measuring at a network node, a packet transfer delay, comprises measuring a buffer residency for the incoming timing packets.

In some embodiments of the invention, the step of measuring at a network node, a packet transfer delay, comprises calculating the difference in source and reception timestamps.

Some embodiments of the invention further comprise a step of determining if the calculated percentage of packet transfer delay measurements falls within a predefined percentage.

Some embodiments of the invention further comprise a step of logging results of the determining step for each predefined time interval.

Another aspect of the present invention is directed to providing a system for monitoring a clock synchronization metric in a timing-over-packet system. The system comprises: measuring means for measuring a packet transfer delay for each of a plurality of incoming timing packets; logging means for logging each packet transfer delay; a first calculating means for calculating a representative statistic of packet transfer delay for the incoming packets received during a predefined time interval, and a second calculating means for calculating a percentage of packet transfer delay measurements received during the predefined time interval within a predefined range from the representative statistic of packet transfer delay.

In some embodiments of the invention, the representative statistic of packet transfer delay to be calculated by the first calculating means comprises a minimum packet transfer delay.

In some embodiments of the invention, the representative statistic of packet transfer delay to be calculated by the first calculating means comprises a median packet transfer delay.

Some embodiments of the invention further comprise a means for determining if the calculated percentage of packet transfer delay measurements falls within a predefined percentage.

Some embodiments of the invention further comprise a means for logging results of the determining step for each predefined time interval.

Another aspect of the present invention is directed to providing a program storage device readable by a machine, tangibly embodying a program of instructions executable by the machine to perform the method steps described above.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

In timing-over-packet communications systems, synchronization information is typically conveyed by injecting timing packets into the data stream instead of relying on synchronous data links between nodes on the network. Various timing-over-packet technologies exist to accomplish this such as: IEEE 1588v2, Adaptive Clock Recovery (ACR), and IETF Network Time Protocol (NTP).

Figure 1:
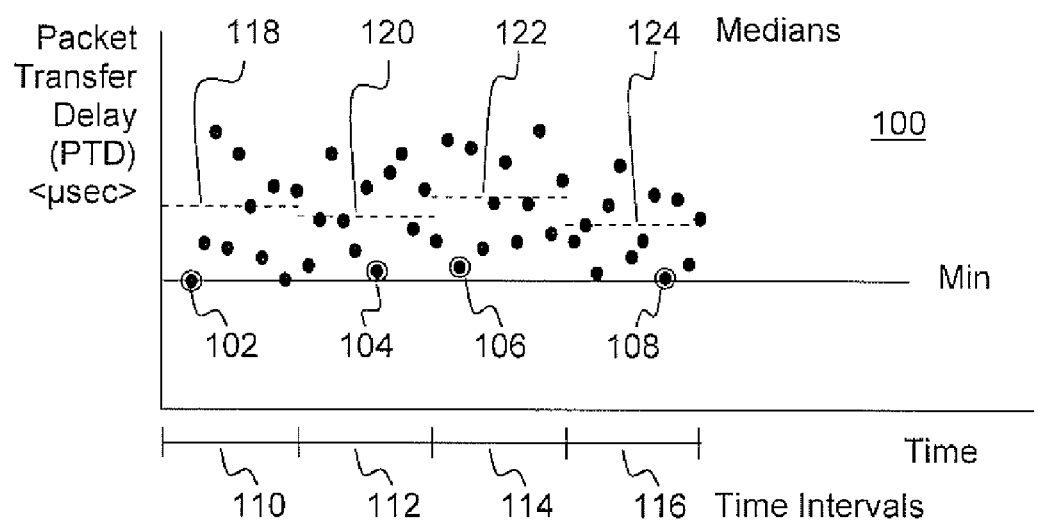
FIG. 1 illustrates a prior art technique for measuring packet transfer delay stability.
Figure 2A:
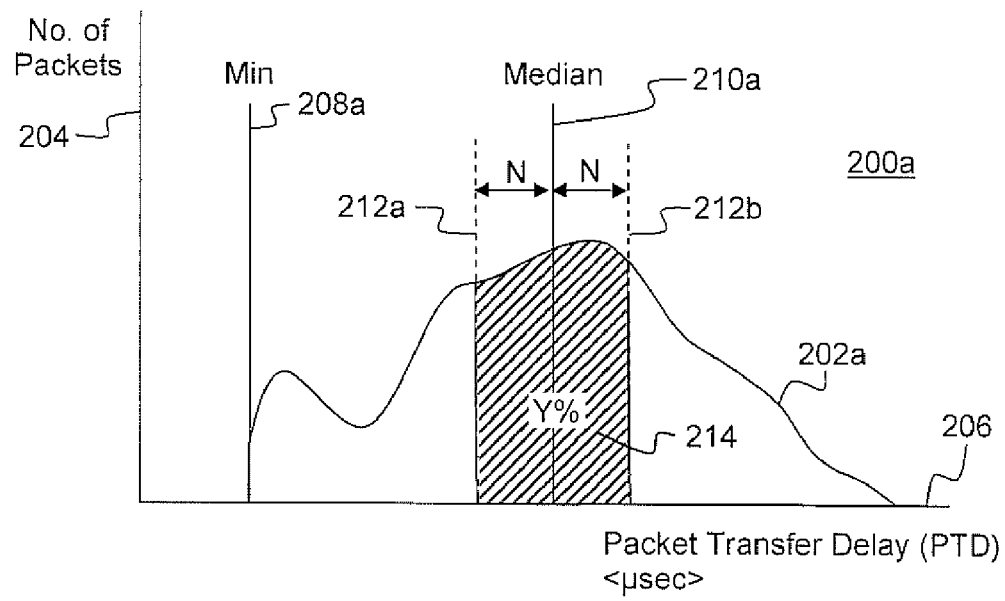
FIGS. 2a and 2b illustrate embodiments of an improved method for measuring packet transfer delay stability.
Figure 2B:
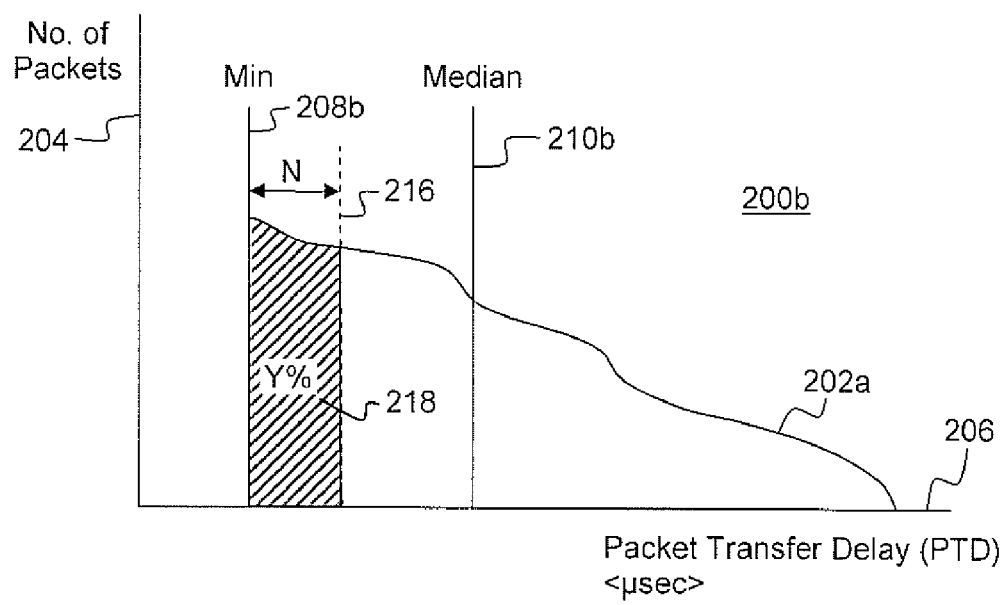

Referring to FIGS. 2a and 2b, graphs 200a, 200b illustrate packet transfer delay histogram curves 202a and 202b representing distributions of packet transfer delay measurements of incoming timing packets received at a communication interface, taken over a predefined time interval Z. Points on curves 202a and 202b represent the number of packets (vertical axis, 204) having a specific packet transfer delay (horizontal axis, 206). Curve 202a represents a distribution of measurements taken from a communication interface with moderate traffic density and curve 202b represents a distribution of measurements taken from a communication interface with relatively low traffic density. Since there is less congestion during periods of low traffic density, typically, fewer timing packets encounter congestion and more a timing packets arrive with little or no delay as illustrated by curve 202b, in contrast to curve 202a.

Lines 208a, 208b represent a minimum packet transfer delay of measurements taken over predefined time interval Z which can easily be calculated from stored values of measured packet transfer delays, or could be calculated in real-time using a simple comparison test. Minimum packet transfer delay is typically defined by the physical limitations of the connection and the link, and not a function of traffic congestion, and thus represents the best-case packet transfer delay. Lines 210a, 210b represent a median packet transfer delay calculated from measured packet transfer delays, which can be accomplished by simple statistical calculations of stored values of measured packet transfer delays, or could be calculated using a linked list to order each incoming timing. Median packet delays become more predominate when there is a large number of queuing points in the transmission path.

An example of a time interval Z is in the order of two seconds, which would allow time to collect a representative number of timing packets to measure packet transfer delay while being short enough to allow for a timely response to the measurement request.

For the purpose of providing a metric for measuring timing-over-packet clock synchronization performance, to provide a measure for service-level agreements (SLA), it is useful to provide a measure of the stability of the packet transfer delay and in particular the stability of the representative statistic used by the timing-over-packet clock. Thus, a useful measure would be a specific percentage Y (represented by the area 214) of packet transfer delay measurements for incoming timing packets arriving within a performance target of N microseconds (212a, 212b) from a representative statistic of packet transfer delay. This provides an indication of how consistently the timing-over-packet clock will encounter a window that includes the representative statistic in the acceptable range. A representative statistic can be a calculated median value of packet transfer delays measured during time interval Z. The median is a useful representative statistic because it provides a measure of the distribution of packet transfer delay measurements, especially in networks with moderate or high packet traffic.

Another representative statistic could be a minimum value of packet transfer delay as illustrated in FIG. 2b. This could be especially useful in networks which typically experience low packet traffic.

Figure 3:
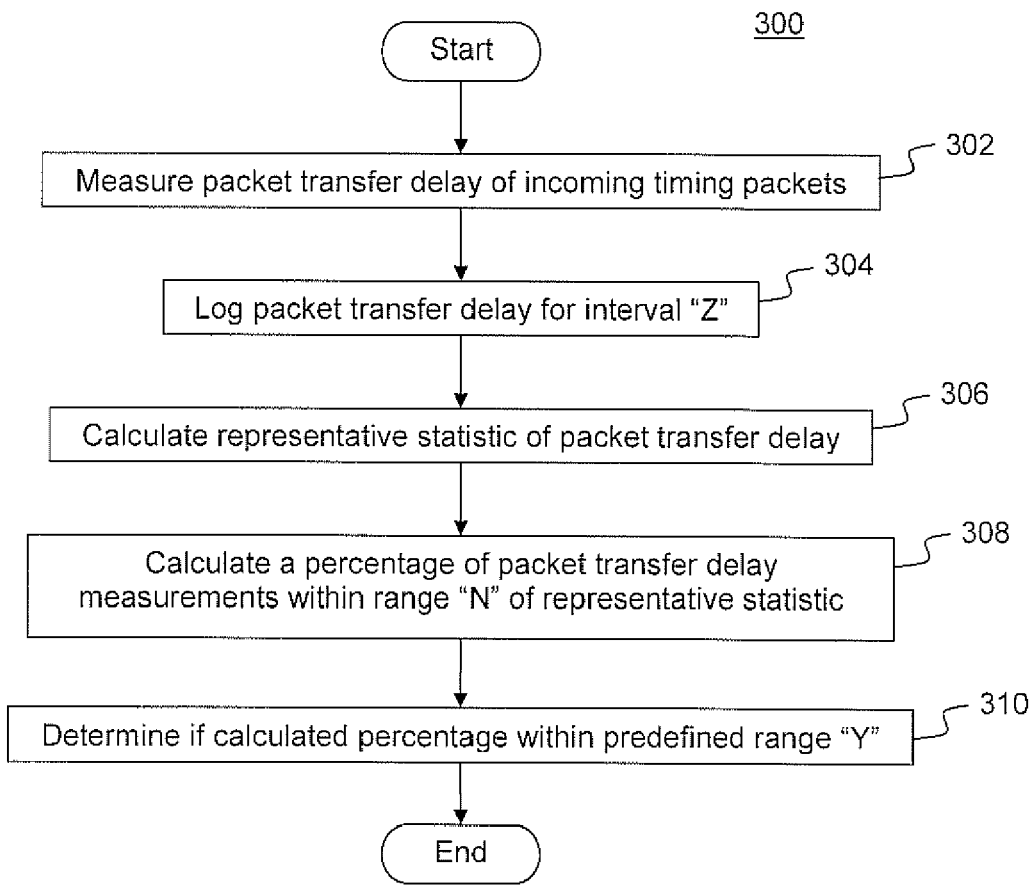
FIG. 3 illustrates a flowchart of an embodiment of a method of the present invention.

Thus, according to one embodiment of the method of the present invention, with reference to FIG. 3, the process 300 for monitoring a clock synchronization metric starts at step 302 where incoming timing packets are received at a packet data communications interface. Timing packets for timing-over-packet synchronization are typically injected into the packet data stream at regular intervals. For example, during a 2-second measurement interval "Z", on the order of 100 timing packets could be received. The packet transfer delay is then measured for each incoming timing packet. Packet transfer delay can be measured using any one of several techniques well known in the art, including, for example, measuring the incoming packet buffer residency time, wherein a longer residency time implies a shorter packet transfer delay.

At step 304 the measured packet transfer delay is logged for each incoming timing packet received during the interval "Z". At step 306 in representative statistic of packet transfer delay is calculated. One example of a representative statistic is a calculation of the median value 210a of the packet transfer delay measurements. Another example of a representative statistic is a calculation of the minimum value 208b of the packet transfer delay measurements.

At step 308 a percentage 214 of packet transfer delay measurements within a predefined range "N" of representative statistic is calculated. For example, the representative statistic could be a median value 210a of packet transfer delay measurements and "N" could be on the order of 20 microseconds, thus the number of measurements between 212a and 212b is represented by percentage 214. 212a and 212b are determined by calculating the median of the entire data set then subtracting "N" to determine 212a and adding "N" to determine 212b. By counting the number of samples contained in the histogram bins from the bin containing delay 212a to bin containing 212b, the number of packets within the range can be determined. Dividing this number by the total number of packets sampled in the interval Z, would yield the percentage of packets 214 within the range "N" of the representative statistic 210a.

At step 310, the system determines if the calculated percentage 214 is within a predefined threshold percentage of "Y %". If percentage 214 is within "Y %", then it indicates that the network could be expected to deliver the representative statistic stably over many windows of the timing-over-packet clock operation and the network meets the defined performance metric. This measure can be used to specify a useful and realistic Service Level Agreement (SLA) that can be easily defined, measured and computed. Step 310 can additionally log the resulting determination for different time intervals "Z" to provide documentation to a customer specifying a specific SLA performance provided by a service provider's network.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method for monitoring a clock synchronization metric in a timing-over-packet system, the method comprising:
    measuring at a network node, a packet transfer delay for each of a plurality of incoming timing packets;
    logging each said packet transfer delay;
    calculating a representative statistic of packet transfer delay for said incoming timing packets received during a predefined time interval, and
    calculating a percentage of packet transfer delay measurements received during said predefined time interval within a predefined packet transfer delay range measured from said representative statistic of packet transfer delay.

2. The method of claim 1, wherein said representative statistic of packet transfer delay is a minimum packet transfer delay.

3. The method of claim 1, wherein said representative statistic of packet transfer delay is a median packet transfer delay.

4. The method of claim 1, wherein said step of measuring at the network node, the packet transfer delay, comprises:
    measuring a buffer residency for said incoming timing packets.

5. The method of claim 1, wherein said step of measuring at the network node, the packet transfer delay, comprises:
    calculating a difference in source and reception timestamps.

6. The method of claim 1, further comprising:
    determining if said calculated percentage of packet transfer delay measurements falls within a predefined percentage.

7. The method of claim 6, further comprising:
    logging results of said determining step for each said predefined time interval.

8. The method of claim 1, further comprising:
    counting a number of samples contained in histogram bins.

9. The method of claim 1, further comprising:
    specifying a Service Level Agreement (SLA).

10. A system for monitoring a clock synchronization metric in a timing-over-packet system, the system comprising a processor that is configured to:
    measure a packet transfer delay for each of a plurality of incoming timing packets;

log each said packet transfer delay;

calculate a representative statistic of packet transfer delay for said incoming packets received during a predefined time interval; and calculate a percentage of packet transfer delay measurements received during said predefined time interval within a predefined packet transfer delay range measured from said representative statistic of packet transfer delay.

11. The system of claim 10 wherein said representative statistic of packet transfer delay comprises a minimum packet transfer delay.

12. The system of claim 10 wherein said representative statistic of packet transfer delay comprises a median packet transfer delay.

13. The system of claim 10, wherein the processor is further configured to determine if said calculated percentage of packet transfer delay measurements falls within a predefined percentage.

14. The system of claim 13, wherein the processor is further configured to log results of said determining step for each said predefined time interval.

15. A non-transitory program storage device readable by a machine, tangibly embodying a program of instructions executable by the machine to perform the method of claim 1.

* * * * *